United States Patent
Chouings

[15] 3,650,571
[45] Mar. 21, 1972

[54] FLUID PRESSURE BRAKING SYSTEMS

[72] Inventor: Leslie C. Chouings, Leamington Spa, England

[73] Assignee: Automotive Products Company Limited, Leamington Spa, England

[22] Filed: Sept. 22, 1969

[21] Appl. No.: 859,716

[30] Foreign Application Priority Data

Sept. 23, 1968    Great Britain......................45,124/68

[52] U.S. Cl. ...................................303/10, 303/6, 303/22 A
[51] Int. Cl. ..........................................................B60t 13/14
[58] Field of Search ....................303/22, 22 A, 6, 10, 52–54; 188/195

[56] References Cited

UNITED STATES PATENTS

| | | | |
|---|---|---|---|
| 1,663,647 | 3/1928 | Brush | 303/10 X |
| 3,459,226 | 8/1969 | Schultz | 303/10 X |
| 3,526,440 | 9/1970 | Blair | 303/10 X |
| 3,466,099 | 9/1969 | Schultz | 303/54 X |
| 3,475,059 | 10/1969 | Klein | 303/22 A |

Primary Examiner—Milton Buchler
Assistant Examiner—John J. McLaughlin
Attorney—Lawrence J. Winter

[57] ABSTRACT

In a liquid pressure braking system having two separate conduit systems through which liquid under pressure is fed to separate motor cylinders for applying brakes to a wheel of a motor vehicle by operation of a driver operable control valve, and wherein a liquid accumulator is provided in each system, the two accumulators being supplied with liquid under pressure through a corresponding nonreturn valve by a continuously operable pump, a pressure control valve is provided in the conduit system leading to a motor cylinder operating brakes on a rear wheel of the vehicle, the pressure control valve being operated in response to changes in the vertical position of the vehicle's body relative to the wheels to control the pressure of liquid supplied to that motor cylinder in relation to the loading of the vehicle.

13 Claims, 8 Drawing Figures

Patented March 21, 1972 3,650,571

INVENTOR
BY
ATTORNEY

FLUID PRESSURE BRAKING SYSTEMS

This invention relates to a fluid pressure braking system for a vehicle, the braking system being of the kind which includes a fluid reservoir, a fluid pump, two conduit systems, each conduit system including a nonreturn inlet valve, a fluid pressure accumulator and a motor cylinder in which fluid pressure acts to apply a brake to a wheel of the vehicle, the fluid pump being arranged to be operated continuously during operation of the vehicle to draw fluid from the fluid reservoir and to deliver that fluid, each fluid pressure accumulator being supplied through the corresponding nonreturn inlet valve with fluid under pressure delivered by the fluid pump, and driver operable control valve means arranged to control the supply of fluid under pressure from the fluid pressure accumulator to the motor cylinder of each conduit system.

Such a fluid pressure braking system is sometimes referred to as a divided system and is arranged so that failure of a part of it does not result in loss of braking on all the wheels of the vehicle.

According to this invention there is provided a fluid pressure braking system of the kind described for a vehicle, including a single cutoff valve between the fluid pump and the two nonreturn inlet valves, the single cutoff valve being arranged to divert to the fluid reservoir fluid delivered by the fluid pump when the pressure of fluid in the two fluid pressure accumulators is at a predetermined level.

According to a preferred embodiment of this invention a fluid pressure control valve is provided to control the pressure of fluid supplied to the motor cylinder of one of the conduit systems by operation of said driver operable control valve means, said fluid pressure control valve being operated in response to changes in the vertical position of the vehicle body relative to the vehicle wheels to control the fluid pressure acting in the motor cylinder of said one conduit system in relation to the loading of the vehicle.

Preferably the two nonreturn inlet valves are located within a common valve body. The common valve body may have a through bore connected at each of its ends to the fluid pressure accumulator of the corresponding conduit system and intermediate its ends to the fluid pump via the cutoff valve, two pistons in the through bore urged by spring means mounted between them against stops which locate them one on each side of the connection to the fluid pump, and passages for the flow of fluid past the pistons from the fluid supply means to the fluid pressure accumulators, each of said nonreturn inlet valves being positioned within the corresponding one of said passages, the arrangement being such that upon the occurrence of an acceptable reduction in the pressure of fluid delivered to the space between the two pistons, the two pistons move towards each other to reduce the volume of the space therebetween and to restore the predetermined fluid pressure therein. The fluid pressure braking system may also include fluid pressure responsive control means for a warning device, the fluid pressure responsive control means including an actuating plunger slidable in a cylinder connected to said through bore in substantially the same cross-sectional plane thereof as the connection to the fluid pump. The fluid pressure responsive control means may include an electric switch which is spring biased to its closed position and which is arranged to be held open by the action on said actuating plunger of fluid under pressure supplied to said through bore, the arrangement being such that the fluid pressure acting on said actuating plunger to hold said electric switch open is reduced upon the occurrence of a substantial drop of pressure in one of said conduit systems so that the electric switch is closed to operate the warning device.

Conveniently the driver operable control valve means comprises a control valve for controlling simultaneously the supply of fluid under pressure from the fluid pressure accumulator of each conduit system to the corresponding motor cylinder or cylinders. The control valve may comprise two valve plungers mounted in parallel side by side valve bores and axially movable to connect motor ports in said valve bores selectively to a corresponding one of the two fluid pressure accumulators or to a drain, the motor ports being connected to the corresponding motor cylinders, a substantially rigid plate movable to apply thrust to both of said valve plungers, and a pad of elastomeric material through which thrust is applied to the substantially rigid plate to move the valve plungers towards the positions in which they connect the motor ports to the fluid pressure accumulators, the arrangement being such that pressure existing in the motor ports acts on the valve plungers to urge them against said pad.

The fluid pressure control valve may be controlled by liquid pressure in a strut or strut system which transmits weight to the vehicle wheels, or may be a pressure reducing valve in which the degree of pressure reduction is controlled by variations in the load supported by the vehicle wheels.

Where the fluid pressure control valve is controlled by liquid pressure in a strut or strut system, the fluid pressure control valve may comprise a valve casing adapted for mounting on the body of the vehicle, one valve device in said casing including a control valve member slidable in a control valve bore and adapted to control flow of fluid between the driver operable control valve means and the corresponding motor cylinder or cylinders, said control valve member being arranged to be urged in a valve opening direction by the liquid pressure acting in said strut or strut system and in a closing direction by the fluid pressure acting in said motor cylinder or cylinders. The fluid pressure braking system may also include a levelling valve which is associated with the fluid pressure control valve and which conveniently is mounted in the same valve casing as the fluid pressure control valve. The levelling valve may have a levelling valve spool slidable in a levelling valve bore and adapted to be connected to an axle or wheel mounting of the vehicle so as to be moved in the levelling valve bore by relative vertical displacement of the vehicle body and the axle or wheel mounting, said levelling valve spool being arranged to control connections between the liquid filled strut or strut system, which is arranged between the vehicle body and the axle or wheel mounting, said fluid supply means and a drain, and to trap liquid in said strut or strut system at a pressure so related to the weight supported by said strut or strut system that the vehicle structure is supported at a predetermined level.

Where the fluid pressure control valve is a pressure reducing valve it may comprise a reducing valve plunger slidable in a reducing valve bore and having therein a cavity in constant communication with the fluid supply means, one end of the reducing valve bore being connected to the corresponding motor cylinder or cylinders, a passage in said reducing valve plunger connecting the cavity to said one end of the reducing valve bore, a closure valve member in said cavity to close said reducing valve plunger passage, rod means extending through said reducing valve plunger passage and arranged to hold said closure valve member off its seat when said reducing valve plunger is in a predetermined position in the reducing valve bore, and resilient loading means urging said reducing valve plunger towards said predetermined position, the loading of said resilient loading means increasing with the load supported by the vehicle wheels, the arrangement being such that the fluid pressure at said one end of the reducing valve bore acts to displace the reducing valve plunger against the resilient loading means and therefore to close the closure valve when the pressure at said one end of the reducing valve bore provides a thrust on the reducing valve plunger sufficient to move it against the resilient loading means.

Preferably the fluid pressure control valve is provided to control the pressure of fluid supplied to a motor cylinder in which the fluid pressure acts to apply a brake to a rear wheel of the vehicle.

Two embodiments of this invention will now be described by way of example with reference to the accompanying drawings in which:

FIG. 8 is a sectional elevation of the regulating valve of the liquid pressure braking system of FIG. 7.

Figure 1:
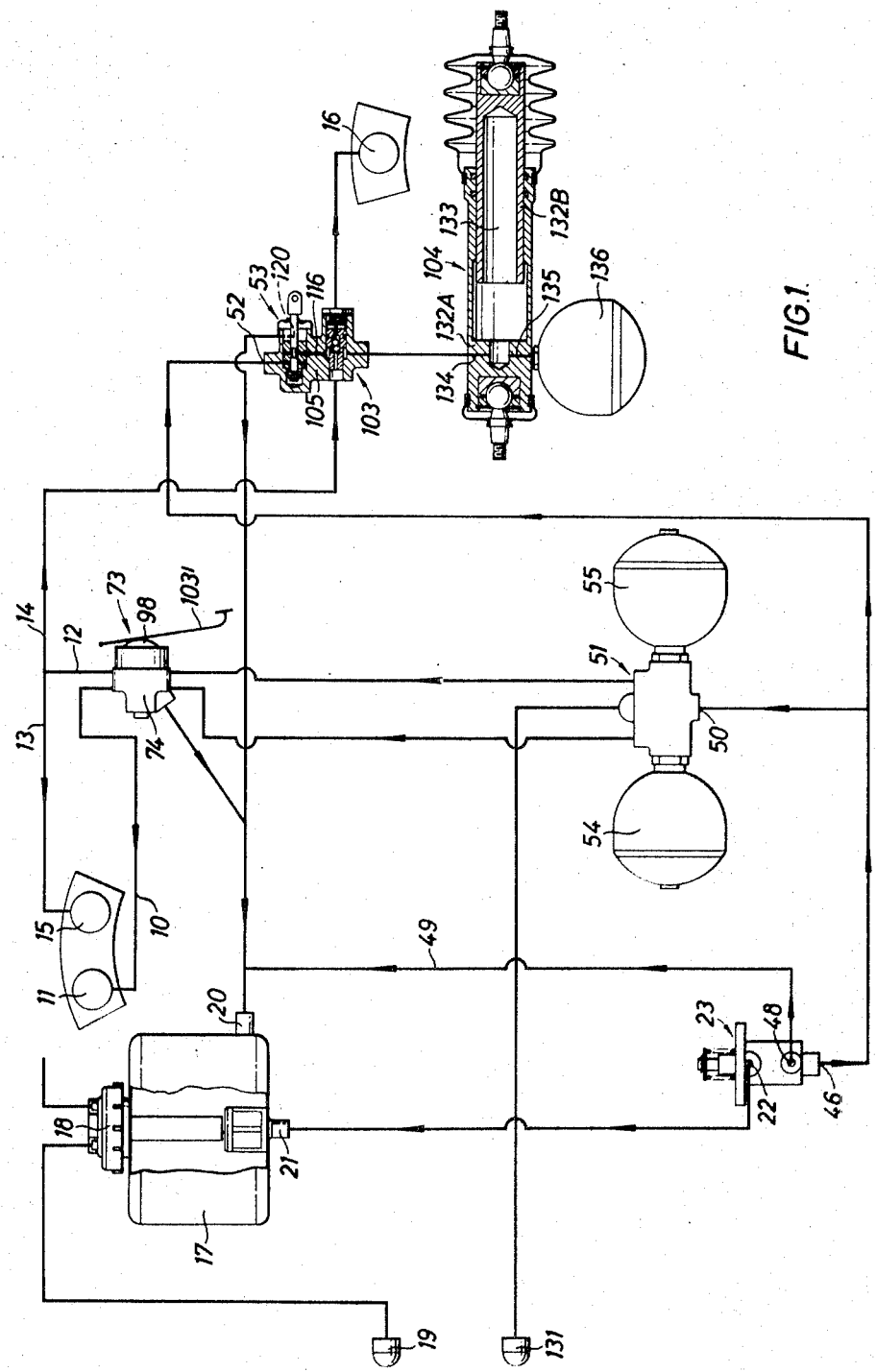
FIG. 1 is a diagrammatic representation of one embodiment of a liquid pressure braking system of the divided continuous flow and stored energy type for a motor vehicle in accordance with this invention.

Referring to the drawings, FIG. 1 illustrates diagrammatically one embodiment of a liquid pressure braking system of the divided continuous flow and stored energy type which is arranged to supply liquid under pressure through a pipe 10 to a motor cylinder 11 to apply one or more brakes to one wheel of a vehicle and through another pipe 12 and branch pipes 13 and 14 leading respectively from the pipe 12 to motor cylinders 15 and 16, the motor cylinder 15 being arranged to apply one or more brakes to the same wheel of the vehicle as the motor cylinder 11 and the motor cylinder 16 being arranged to apply one or more brakes to a different wheel which is a rear wheel of the vehicle. It will be appreciated that the liquid pressure braking system illustrated may be modified so that liquid under pressure is supplied simultaneously to two or more motor cylinders through branch pipes from the pipe 10 and through further branch pipes from the branch pipes 13 and 14, each motor cylinder being arranged to apply one or more brakes to a corresponding wheel of the vehicle. For the sake of convenience, only the motor cylinders 11, 15 and 16 are shown in FIG. 1.

The liquid pressure braking system comprises a liquid reservoir 17 provided with a liquid level sensing device 18 which is connected electrically to an electrically operated light 19 through the ignition switch of the vehicle so that the light 19 is illuminated when the ignition switch is switched on and the level of liquid within the reservoir 17 has fallen to a predetermined level. The reservoir 17 has an inlet port 20 and an outlet port 21.

The outlet port 21 is in conduit communication with the liquid inlet port 22 of a combined pump and cutoff valve 23 which is arranged to be driven continuously by the engine of the vehicle during operation of that engine.

Figure 2:
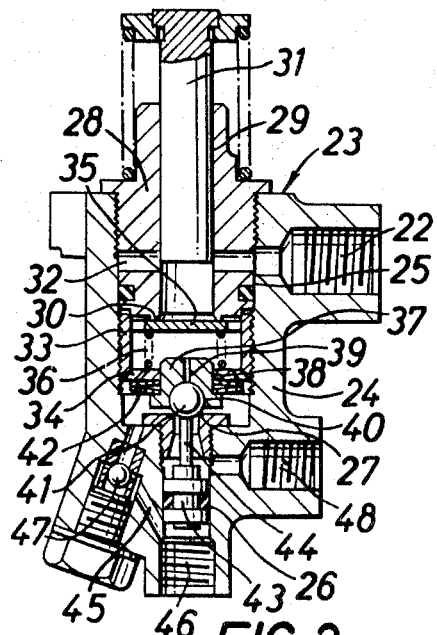
FIG. 2 is a sectional elevation of the combined pump and cut off valve of the liquid pressure braking system of FIG. 1.

Referring to FIG. 2, the combined pump and cutoff valve 23 comprises a body 24 formed with a cylindrical cavity 25 which opens at one end of the body 24 and which has a coaxial passage 26 extending from its other end to the other end of the body 24. The diameter of the cylindrical cavity 25 is greater than the diameter of the coaxial passage 26. A valve seat 27 is provided around the end of the coaxial passage 26 which opens into the cavity 25. A plug 28 is screwed into the open end of the cavity 25 so as to define a space within the cavity 25 between itself and said other end of the cavity 25. A coaxial bore 29 is formed in the plug 28 and an annular projection 30 is defined on the end of the plug 28 nearer to the coaxial passage 26, the projection 30 surrounding one end of the bore 29.

A piston 31 is mounted for reciprocating motion in the bore 29 which constitutes the pump cylinder. Radial passages 32 formed in the plug 28 are in communication with the pump inlet port 22 and are in communication with the bore 29 when the piston 31 is positioned at the end of its travel furthermost from the coaxial passage 26.

The end of the plug 28 carrying the annular projection 30 is spiggoted into the open end of a cup-shaped member 33 having orifices 34 defined in its base. A circular disc 35 of greater diameter than the annular projection 30 is urged into engagement with the annular projection 30 by a compression spring 36 positioned within the cup-shaped member 33 and taking its abutment on the base thereof. The disc 35 and the annular projection 30 thus cooperate together to provide an outlet valve for the pump cylinder. A stepped cylindrical member 37 is slidably located within a control opening 38 formed coaxially in the base of the cup-shaped member 33, the larger diameter portion of the stepped cylindrical member being positioned on the side of the cup-shaped member 33 remote from the circular disc 35. The stepped cylindrical member 37 is provided with a coaxial passage 39 which opens into a hemispherical depression 40 formed in the end of the stepped cylindrical member 37 remote from the circular disc 35. The hemi-spherical depression 40 is adapted to receive a ball 41 and the stepped cylindrical member 36 is urged towards the valve seat 27 by a stack of Belleville washers 42 which act between its shoulder and the base of the cup-shaped member 33, so as to hold the ball 41 in engagement with the valve seat 27.

A plunger 43 is mounted slidably in the coaxial passage 26 and carries an axially projecting pin 44 which is arranged to engage the ball 41.

A bypass passage 45 defined in the body 24 provides communication between the cylindrical cavity 25 and the port 46 defined by the end of the coaxial passage 26 remote from the plug 28, when the ball 41 is in engagement with the valve seat 27. A nonreturn valve 47 is mounted within the bypass passage 45 so as to allow flow of liquid through the bypass passage 45 only in the direction from the cylindrical cavity 25 to the outlet port 46 and so as to prevent flow of liquid in the opposite direction through the bypass passage 45.

An outlet port 48 is in communication with the coaxial passage 26 at a point therein between the end of the bypass passage 45 which opens into the passage 26, and the valve seat 27.

Referring again to FIG. 1, the outlet port 48 of the combined pump and cutoff valve 23 is in conduit communication with the reservoir inlet port 20 through a pipe 49 and the outlet port 46 is in conduit communication with the inlet port 50 of an isolating valve 51 and with the inlet port 52 of a levelling valve 53.

The isolating valve 51 controls the supply of liquid from the combined pump and cutoff valve 23 to each of two liquid pressure accumulators 54 and 55 and also controls the operation of an electrically operated light 131 which conveniently is connected to its source of electrical energy through the ignition switch of the vehicle and which is arranged to be illuminated when the ignition switch is switched on and the pressure of liquid contained within one only, or in both of the liquid pressure accumulators 54 or 55 falls to a predetermined level.

Figure 3:
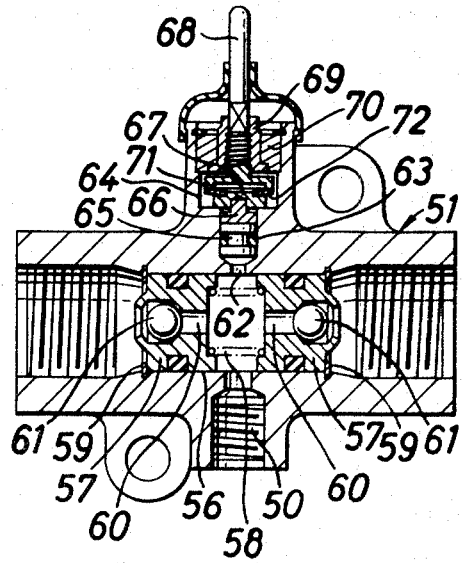
FIG. 3 is a sectional elevation of the isolating valve of the liquid pressure braking system of FIG. 1.

The isolating valve 51 conveniently is as described and claimed in our copending Pat. application No. 45122/68 and is illustrated in FIG. 3.

Referring to FIG. 3, the isolating valve 51 comprises a body having a through bore 56 which is connected at each of its ends to the corresponding liquid pressure accumulator 54 or 55. The isolating valve inlet port 50 opens into the center of the bore 56. Two pistons 57, slidable in the bore 56 and provided with packing rings engaging the wall of the bore 56, are urged by a spring 58 acting between them against stop-rings 59 mounted in grooves in the wall of the bore 56 so that normally they lie one on each side of the port 50. Axial passages 60 in the pistons 57 are controlled by nonreturn valves 61 which allow fluid flow through the pistons 57 only from the port 50 to the ends of the bore 56 and thus only to the liquid pressure accumulators 54 or 55. The nonreturn valves 61 thus serve as the inlet valves through which liquid is supplied under pressure from the pump to the two liquid pressure accumulators 54 and 55.

Diametrically opposite to the port 50 is an orifice 62 leading into a cylindrical bore 63 which in turn leads into a larger cylindrical bore 64. A plunger 65 slidable in the bore 63 supports, through an electrically insulating plug 66, a disc shaped electrical contact member 67 within the larger bore 64 and spaced from the cylindrical wall thereof. A metal pin 68, screwed into a sleeve 69 located in a ring 70 of electrically insulating material fixed in position in the bore 64, has an enlarged head 71 at its end nearer to the bore 63. A disc spring washer 72 acts between the contact 67 and the head 71 to urge the contact 67 towards an annular contact surface defined by the end of the bore 64 surrounding the opening of the bore 63. The diameter of the contact 67 is greater than that of the bore 63 so that it is able to engage the annular contact surface. The plunger 65 serves as the actuating member of the electric switch which is connected in the circuit including the light 131 and of which the cooperating contact surfaces are the annular contact surface defined by the end of the bore 64 surrounding the opening of the bore 63 and the cooperating face of the contact member 67, the position of the actuating plunger 65 controlling the relative disposition of the contacts.

Figure 4:
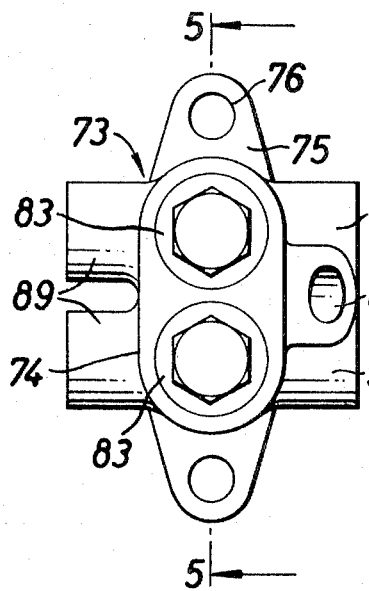
FIG. 4 is an end view of the driver's control valve of the liquid pressure braking system of FIG. 1.
Figure 5:
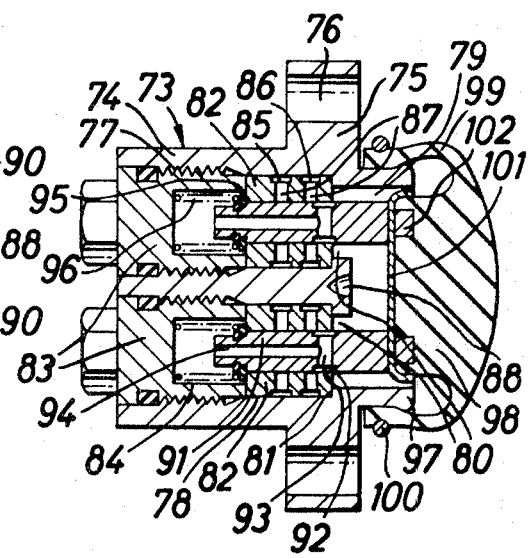
FIG. 5 is a section on the line V—V of FIG. 4.

Referring again to FIG. 1, communication between each liquid pressure accumulator 54 or 55 and the corresponding pipe 10 or 12 is controlled by a driver's control valve 73 which conveniently is as described and claimed in our copending application No. 31852/68 and which is illustrated in FIGS. 4 and 5 of the accompanying drawings.

Referring to FIGS. 4 and 5, the driver's control valve 73 comprises a valve body 74 provided adjacent one end thereof with a pair of laterally projecting lugs 75 apertured at 76 to receive bolts for fixing the valve body 74 in a suitable position in the vehicle, for example on the toe board or the driver's compartment. The valve body 74 is formed with two closely adjacent parallel longitudinal valve bores 77 and 78 which open into a common recess 79 at the end of the body 74 adjacent the lugs 75, through openings 80 of smaller diameter than the valve bores 77 and 78 themselves. Thus shoulders 81 are provided at the sides of the openings 80 facing into the valve bores 77 and 78. The opposite ends of the valve bores 77 and 78 are screw-threaded. An annular bush 82 is held in each valve bore 77 and 78, against the shoulder 81 therein, by a screw-threaded plug 83 screwed into the valve bore 77 or 78, each plug 83 having a coaxial cavity 84 at its end nearer to the recess 79. Each bush 82 is a close fit in the associated valve bore 77 or 78, and has two axially spaced circumferential grooves 85 and 86 in its outer surface. Radial passages 87 lead to the bore of the bush from each groove 85 or 86. The circumferential grooves 85 being those nearer to the plugs 83, are each connected to the corresponding liquid pressure accumulator 54 or 55, and the other circumferential grooves 86 are each connected to the corresponding pipe 10 or 12. The common recess 79 is connected by way of a drain passage 88 to the liquid reservoir 17.

The connections of the grooves 85 and 86 to the liquid pressure accumulators 54 and 55 and to the pipes 10 and 12 are provided by passages in bores 89 and 90 projecting laterally in opposite directions from the valve body 74, the bores 89 and 90 being shown in FIG. 4.

In the bore of each bush 82 there is slidably mounted a valve plunger 91 having a circumferential groove 92 therein, which groove 92 is connected by radial passages 93 in the plunger 91 to a longitudinal bore 94 therein leading to the cavity 84 in the associated plug 83. The circumferential groove 92 in each valve plunger 91 is of such a width, and the radial passages 87 in the bushes 82 which are connected to the pipes 10 and 12 are so spaced from the radial passages 87 connected to the liquid pressure accumulators 54 and 55, and from the ends of the bushes 82 abutting the shoulders 81 in the valve bores 77 and 78, that the circumferential grooves 92 in the plungers 91 can connect the radial passages 93 either to both of the corresponding radial passages 87 or to the common recess 79 and to the corresponding radial passage 87 which serves as a motor port providing communication to the corresponding motor cylinder or cylinders from the pipe 10 or 12.

Thus the motor cylinders 11, 15 and 16 can be connected either to the liquid pressure accumulators 54 and 55 or to the liquid reservoir 17.

The valve plungers 91 project into the coaxial cavities 84 in the plugs 83. Washers 95 retained against shoulders on the valve plungers 91 by split rings are urged against the adjacent ends of the bushes 82 by coil compression springs 96 in the cavities 84 to position the plungers 91 with the circumferential grooves 92 therein connecting the radial passages 87 which are connected to the pipes 10 and 12 to the common recess 79.

The other ends of the valve plungers 91 project into the common recess 79 which is circular in cross section and is surrounded by a generally cylindrical wall 97. A pad 98 of elastomeric material, also circular in cross section extends over the open end of the recess 79, the pad 98 having at its outer end a flexible flange 99 which embraces the wall 97 and is clamped by a clip 100 against the outer surface of the cylindrical wall 97 to provide a liquid type closure of the recess 79.

A substantially rigid metal plate 101 is bonded to the end face of the pad 98 which extends over the recess 79. The valve plungers 91 have reduced end portions 102 which pass through holes in the plate 101 into cavities in the pad 98, so that the valve plungers 91 are located with respect to the pad 98 and can receive axial thrust therefrom through the engagement of the plate 101 with shoulders on the plungers 91.

The outer surface of the pad 98 is domed as shown in FIG. 5, and pressure is applied to the domed outer surface to actuate the valve plungers 91 by, for example, a foot pedal 103' (see FIG. 1).

The consistency of the elastomeric material of which the pad 98 is formed, and/or its shape, are so selected that it will deform readily to some extent under pressure, without transmitting any substantial thrust to the plate 101 and the valve plungers 91, thus enabling the brakes to be applied smoothly even if pressure is exerted very rapidly on the pad 98.

When the pad 98 is not subjected to pressure, the pipes 10 and 12 are, as above described, connected to the liquid reservoir 17, so that no pressure is exerted in the motor cylinders 11, 15 and 16 to apply the brakes.

Referring again to FIG. 1, the pressure of liquid fed through the branch pipe 14 to the motor cylinder 16 is controlled by a pressure regulating valve 103 and the operation of the pressure regulating valve 103 is controlled by the levelling valve 53 and by the pressure of liquid in a liquid containing strut 104 which supports the weight of the vehicle and in which the liquid pressure is varied automatically due to changes in vehicle loading to maintain the vehicle body at a constant height, so that the maximum pressure of liquid fed to the motor cylinder 16 varies with the vehicle loading.

Figure 6:
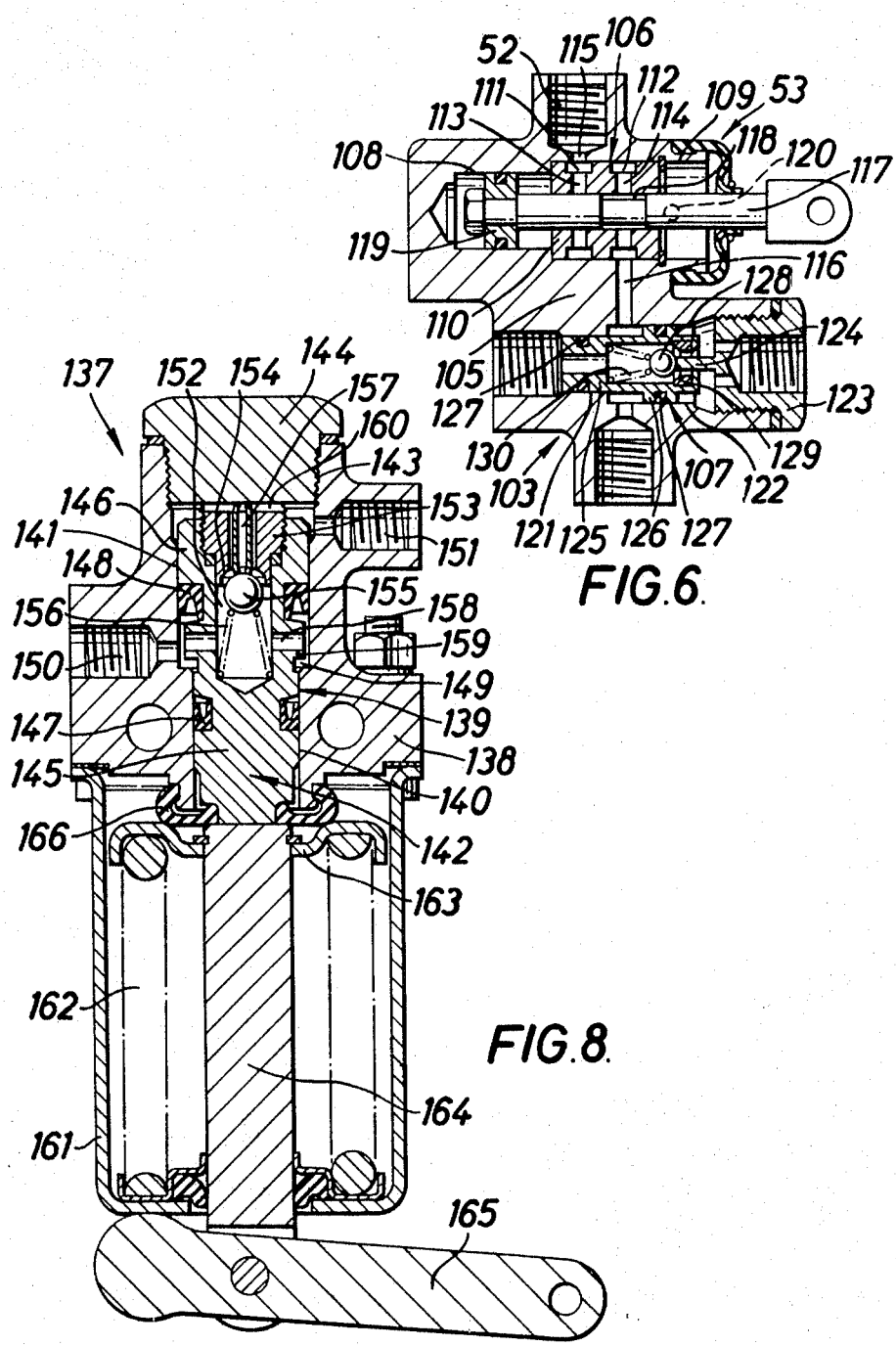
FIG. 6 is a sectional elevation of the combined levelling and pressure regulating valve of the liquid pressure braking system of FIG. 1.

Conveniently the levelling valve 53 and the pressure regulating valve 103 are mounted in a common casing 105 and the construction and operation of such a combined levelling and brake pressure regulating valve conveniently is as described and claimed in our copending Pat. application No. 45123/68, and is illustrated in FIG. 6 of the accompanying drawings.

Referring to FIG. 6, the casing 105 is formed with two parallel bores 106 and 107. The bore 106, houses the levelling valve 53, is closed at one end, and is stepped intermediate its ends to provide a smaller diameter portion 108 adjacent its closed end a larger diameter portion 109 adjacent its open end. A sleeve 110 mounted in the bore portion 109 and having an internal diameter less than that of the bore portion 108 is formed externally with two longitudinally spaced circumferential grooves 111 and 112 connected respectively by a radial drilling 113 or 114 to the bore of the sleeve 110. The groove 111 is nearer the bore portion 108 than is the groove 112. The sleeve 110 is held by clip ring against the step in the bore 106, and the circumferential groove 111 therein registered with a passage 115 in the valve body 105, the passage 115 being in communication with the levelling valve inlet port 52. The circumferential groove 112 registers with a passage 116 in the valve body 105 which intersects the bore 107 and is connected to the suspension strut 104 through the pressure regulating valve 103. It will be understood that the weight of the vehicle body is transmitted to a vehicle axle through the suspension strut 104.

A valve spool 117, which serves as the levelling valve member and is slidable in the bore of the sleeve 110, projects from the open end of the bore 106 and is connected to a suitable linkage (not shown) so that the position of the valve spool 117 in the bore of the sleeve 110 depends on the vertical distance between the vehicle body and the axle connected to the suspension strut 104.

The valve spool 117 is formed with a circumferential groove 118 which is in constant communication through the drilling 114 with the passage 116, and carries a piston 119 in the bore portion 108. The piston 119 provides a dash pot action to damp movement of the valve spool 117.

Downward movement of the vehicle body relative to the axle to which the suspension strut 104 is connected tends to move the spool 117 towards the closed end of the bore 106 until the groove 118 connects the passage 116 to the passage 115, thus connecting the strut 104 to the levelling valve inlet port 52 and enabling liquid from the combined pump and cutoff valve 23 to be fed into the suspension strut 104 to raise the vehicle body until the latter is restored to its normal level. Upward movement of the vehicle body from its normal level tends to move the valve spool 117 towards the open end of the bore 106 until the groove 118 opens into the bore portion 109 beyond the sleeve 110 and connects the passage 116 to a drain port 120 communicating with that bore portion 109 and leading to the reservoir inlet 20. The vehicle body is thus allowed to move downwardly relative to the wheels until, when the normal level is reached, the groove 118 is again closed by the sleeve 110. Thus the liquid pressure in the passage 116 which corresponds to the liquid pressure in the strut 104, is a measure of the load carried by the vehicle.

The bore 107 which houses the pressure regulating valve 103 is also stepped to provide a portion 121 at one end of smaller diameter and a portion 122 at the other end of a larger diameter, the passage 116 intersecting the portion 122 of the said bore 107 adjacent the step thereof. The end of the bore portion 121 is connected to the driver's control valve 73 through the branch pipe 14 and the pipe 12. A plug 123 closing the end of the bore portion 122 is formed with apertures to allow liquid from that end of the bore 107 to pass to the liquid pressure motor cylinder 16, the pressure in which is controlled by the regulating valve 103. A pin 124 carried by the plug 123 projects into the bore portion 122 for a purpose hereinafter described.

A tubular plunger 125 has one end fitting slidably in the bore portion 121, and an enlargement 126 fitting slidably in the bore portion 122, packing rings 127 being provided on the enlargement 126 and on the smaller end of the tubular plunger 125 within the bore portion 121. A ball 128, urged towards a seat 129 in the bore of the tubular plunger 125 by a spring 130 is held off the seat 129 under certain conditions by the pin 124 to provide a free passage through the bore 107 for liquid in the braking system.

It will be observed that liquid pressure acting in the motor cylinder 16 will act on the full area of the plunger 125 exposed in the bore portion 122, and liquid pressure acting in the strut 104 will act on the annular area of the plunger 125 facing the step in the bore 107. Thus, for any given liquid pressure acting in the strut 104 there will be a value of liquid pressure acting in the braking motor cylinder 16 at which the said last-mentioned liquid pressure will be sufficient to move the plunger 125 towards the smaller diameter bore portion 121, allowing the ball 128 to seat and prevent further increase of pressure in the brake motor cylinder 16. Thus the maximum degree of braking which can be obtained depends on the liquid pressure in the strut 104, and so depends on the loading of the vehicle.

Referring again to FIG. 1, the strut 104 comprises two tubular members 132A and 132B, the tubular member 132B sliding within the tubular member 132A in telescopic fashion.

The tubular members 132A and 132B each have one open and one closed end, the two closed ends being the furthermost apart of the ends of the two tubular members so that a chamber 133 is defined by the two tubular members 132A and 132B. The chamber 133 contains liquid of the liquid pressure braking system. The closed end of the tubular member 132A carries a passage 134 which is in conduit communication with the brake pressure regulating valve 103 and a further passage 135 which is in communication with the interior of an accumulator 136 of the diaphragm separation type having a compressible gas on the side of the diaphragm remote from the strut 104.

In operation of the liquid pressure braking system described above the piston 31 is driven continuously by the engine of the vehicle for reciprocatory movement within the cylinder defined by the coaxial bore 29, the piston 31 creating suction in the coaxial bore 29 during its outward stroke and thus drawing liquid from the reservoir 17 through the inlet port 22 into the axial bore 29. During its inward movement the piston 31 forces liquid in the axial bore 29 past the outlet valve disc 35 and through the passages 34 into the chamber defined within the cylindrical cavity 25 on the opposite side of the cup-shaped member 33. Such liquid is forced through the bypass passage 45 past the nonreturn valve 47 to the outlet port 46 and is thus fed to the isolating valve 51 and the levelling valve 53. As the liquid pressure in the accumulators 54 and 55 and, where necessary, in the liquid filled strut 104 builds up to a predetermined pressure so that the pressure at the outlet port 46 builds up correspondingly, the plunger 43 is moved to displace the ball 41 from the valve seat 27 and allow liquid to flow through the valve seat 27 to the outlet port 48 thus to be returned to the reservoir 17. It will be appreciated that once the pressure of liquid in the accumulators 54 and 55 and the liquid filled strut 104 has reached a predetermined level, liquid drawn from the reservoir 17 by the pump is returned to the reservoir 17 through pipe 49.

The liquid fed to the isolating valve 51 through the inlet port 50 flows to the two liquid pressure accumulators 54 and 55 through the passages 60 in the pistons 57 and the pressure of liquid between the pistons 57 acts upon the plunger 65 to hold the movable contact member 67 spaced from the cooperating annular contact surface defined by the valve body of the isolating valve 51 which valve body is earthed to the structure of the vehicle upon which the isolating valve 51 is mounted.

If the pressure of liquid delivered to the port 50 falls below the predetermined level due to an acceptable amount of leakage from the conduit system interconnecting the combined pump and cutoff valve 23 with the reservoir 17 and the isolating valve 51, the resultant pressure drop across the two pistons 57 will cause them to move towards each other against the action of the spring 58, thus reducing the volume of the space defined between the two pistons 58 and increasing the pressure of liquid therein until the pressure on both sides of the two pistons 58 are balanced again. Thus the isolating valve 51 provides a means for compensating automatically for an acceptable amount of fluid leakage from the conduit system leading to the inlet port 50 which enables the avoidance of excessive actuation of the cutoff valve to supply more liquid to the inlet port 50 to be achieved.

The driver control valve 73 normally isolates the fluid pressure accumulators 54 and 55 from the pipes 10 and 12 and thus from the motor cylinders 11, 15 and 16.

When the driver wishes to apply the brakes to the wheels of the vehicle, he operates the foot pedal 103' to apply pressure to the pad 98. Pressure on the pad 98 displaces both valve plungers 91 to shut off the connection from the motor cylinders 11, 15 and 16 to drain 25 and to connect them to the corresponding liquid pressure accumulators 54 and 55 thus applying the brakes. The pressure exerted in the pipes 10 and 12 and thus in the motor cylinders 11, 15 and 16 also acts on the valve plungers 91, in the coaxial cavity 84 in the end plugs 83 of the driver operated valve 73, to resist movement of the plungers 91 towards the brake applying position and tends to shut off the motor cylinders 11, 15 and 16 from the accumulators 54 and 55 so that the degree of pressure exerted in the motor cylinders 11, 15 and 16 depends on the pressure exerted on the pad 98 and the driver can feel the degree of pressure applied. Due to the resilience of the pad 98 and the consequent freedom for rocking movement of the plate 101, the two valve plungers 91 can take up different positions to balance the pressure in the two groups of motor cylinders 11 and 15 and 16.

If a leak develops in either one of the liquid pressure accumulators 54 or 55, or in any part of the system between one of the accumulators 54 and 55 and the corresponding motor cylinders 11 or 15 and 16, so that there is a drop in the liquid pressure at one only of the two ends of the valve bore 56 of the isolating valve 51, liquid escapes through the passage 60 in the piston 57 between the port 50 and the end of the bore 56 connected to that accumulator 54 or 55 so that there is a reduction in the liquid pressure between the pistons 57 and so that the pressure in the other accumulator forces the other piston 57 inwardly. There is insufficient pressure now available to support the plunger 65, so that the contact member 67 moves under the influence of the disc spring washer 72 and engages the annular contact surface to close the electrical circuit and illuminate the warning light 131 to indicate a loss of liquid pressure.

Figure 7:
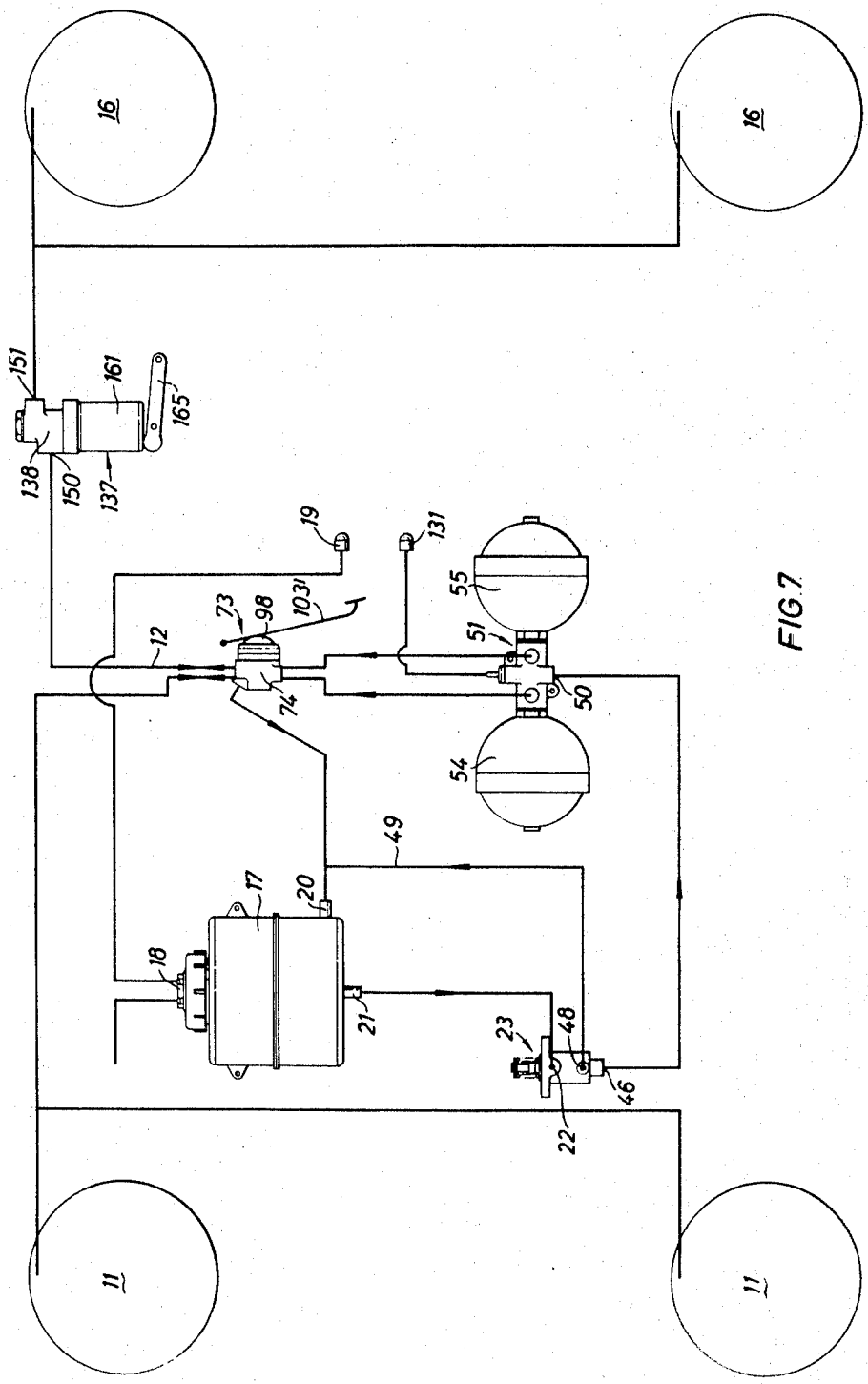
FIG. 7 is a diagrammatic representation of a second embodiment of a liquid pressure braking system of the divided continuous flow and stored energy type for a motor vehicle in accordance with this invention.

FIG. 7 diagrammatically illustrates a second embodiment of a liquid pressure braking system of the divided continuous flow and stored energy type in which parts similar to the liquid pressure braking system described above with reference to FIGS. 1 to 6 have been given the same reference numeral as were employed in the description of FIGS. 1 to 6 and which differs from the liquid pressure braking system described above with reference to FIGS. 1 to 6 in that there is no levelling valve 53 so that the cut off valve feeds liquid only to the isolating valve 51 or the liquid reservoir 17, and in that the pipe 12 only supplies liquid to the motor cylinders 16 which operate the rear wheels of the vehicle, the pressure of liquid supplied to the motor cylinder 16 through the pipe 12 being controlled by a regulating valve 137 in the pipe 12 so that the maximum pressure fed to the motor cylinders 16 is controlled in relation to the loading of the vehicle.

The pressure regulating valve 137 conveniently comprises a pressure reducing valve such as is described in our copending Pat. application No. 44085/68 and is illustrated in FIG. 8 which shows that the reducing valve comprises a valve body 138 formed with a through bore 139, the bore 139 having two portions 140 and 141 to cooperate with a stepped plunger 142, namely a smaller end portion 140 and a portion 141 having diameter greater than that of the portion 140. A screw-threaded end portion 143 of the bore 139 is closed by a screw threaded plug 144.

The reducing valve plunger 142, which is slidable in the bore 139 has an end portion 145 fitting slidably in the bore portion 140, and a second end portion 146 fitting slidably in the bore portion 141, lip-type sealing members 147 and 148 being provided to prevent leakage of liquid between the respective end portions of the plunger 142 and the wall of the bore 139. An annular space 149 is defined by the end of the bore portion 141 adjacent the bore portion 140 and an intermediate portion of the plunger 142, a port 150 in the valve body 138 providing a connection to this space 149 for the pipe 12. A port 151 opens into the screw-threaded end bore portion 143 close to the plug 144 and provides a connection to the brake motor cylinders 16.

A coaxial cavity 152 is formed in the end of the plunger 142 facing the plug 144, a tubular bush 153 being fixedly mounted in the open end of the cavity 152 and having a valve seat 154 around the end of the bore therethrough which is nearer to the closed end of the cavity 152. A ball 155 in the cavity 152 is urged towards the seat 154 by a spring 156, the ball 155 serving as a closure valve member which prevents the flow of liquid through the bore of the bush 153 when it is seated upon the valve seat 154. A rod 157 extends through the bore of the bush 153, engages the plug 144 and as shown in FIG. 8, holds the ball 155 off its seat. The cavity 152 is connected by radial openings 158 in the plunger 142 to the annular space 149. As shown in FIG. 8, an enlargement 159 is provided on the intermediate portion of the plunger 142 to serve as a stop cooperating with the shoulder at the junction of the bore portions 140 and 141 to limit movement of the plunger 142 away from the plug 144.

The end of the tubular bush 153 which faces the plug 144 is grooved diametrically as shown at 160 to ensure that free communication is maintained between the bore of the plunger 142 and the bore portion 143 into which the port 151 opens, when the said end of the tubular bush 153 engages the plug 144.

A cup-shaped casing 161 secured to the valve body 138 at the end thereof opposite to the plug 144 encloses a coiled compression spring 162 acting, through an abutment plate 163 on a stem 164 coaxial with the regulating valve plunger 142 to urge the regulating valve plunger 142 towards the end of the regulating valve bore 139 closed by the plug 144. The stem 164 projects through a central opening in the end of the cup-shaped casing 161, its projecting end being pivotally coupled to a lever 165 intermediate the ends of the said lever 165, one end of the lever 165 bearing against the casing 161 and the other end being acted on by a spring (not shown) to oppose the load exerted on the stem 164 by the spring 162.

The stem 164 abuts against the end of the regulating valve plunger 142 remote from the cavity 152, a flexible annular sealing member 166 being provided between the end of the regulating valve plunger 142 and the regulating valve body 138 to prevent the ingress of foreign matter.

The spring acting upon the lever 165 is connected by linkage (not shown) to a member carried by an axle of the vehicle and is arranged so that the load applied to the lever 165 by the spring is increased with a decrease in the load transmitted from the vehicle structure to the wheels of the vehicle. Thus any decrease in the load transmitted to the wheels of the vehicle increases the opposition to the action of the spring 162 and reduces the load urging the plunger 142 towards the plug 144.

In use of the liquid pressure braking system described above with reference to FIGS. 7 and 8 of the drawings, the operation of the liquid reservoir 17, the combined pump and cutoff valve 23, the isolating valve 51, the two liquid pressure accumulators 54 and 55, the driver's control valve 73 and the motor cylinders 11 is the same as in the embodiment described above with reference to FIGS. 1 to 6, except that the combined pump and cutoff valve 23 feeds liquid only to the isolating valve 51 or go the liquid reservoir 17.

When the foot pedal 103' is operated to connect the pipe 12 to the corresponding liquid pressure accumulator 55, liquid is transmitted through the reducing valve 137 to the motor cylinders 16. The liquid transmitted through the reducing valve 137 acts in the annular space 149 on an annular area of the plunger 142 equal to the difference in cross-sectional area of the bore portions 140 and 141, to urge the plunger 142 towards the plug 144, against which it is already held by the spring 162. The liquid pressure also acts on the whole area of the end of the plunger 142 facing the plug 144 to provide a thrust tending to move the plunger 142 away from the plug 144. When the pressure reaches a certain value, depending on the resultant thrust due to the combined action of the spring 162 and the spring acting on the lever 165, the plunger 142 moves away from the plug 144 allowing the ball 155 to seat and isolating the motor cylinders 16 from the liquid pressure accumulator 55 so that the pressure acting in the motor cylinders 16 cannot increase further.

If whilst the brakes are still applied by the motor cylinders 16, the load on the wheels decreases such as may occur due to weight transference, the load exerted by the spring acting on the lever 165 increases causing the spring 162 to exert a lesser thrust on the plunger 142, so that the plunger 142 moves in a direction away from the plug 144 thus increasing the volume of the screw threaded end bore portion 143 and consequently reducing the pressure in the brake motor cylinders 16. This process continues until equilibrium is again established.

On the other hand, if the liquid pressure in the pipe 12 leading to the inlet port 150 is increased, the thrust urging the plunger 142 to move towards the plug 144 is increased, due to the action of the increased liquid pressure being fed to the annular area 149 of the regulating valve 142 on the differential area between the plunger portions 145 and 146 and the resultant movement of the plunger 142 allows the ball 155 to be unseated by the rod 157 and liquid flows into the screw threaded end bore portion 143 and to the motor cylinders 16 until the pressure in the bore portion 143 rises sufficiently again to balance the spring 162 and allow the ball 155 to reseat.

Various modifications or refinements of the embodiments hereinbefore described may be incorporated without departing from the scope of this invention. For example although both the fluid pressure braking systems described above are liquid pressure braking systems, the invention is applicable equally to fluid pressure braking systems incorporating compressed air as the operating fluid. Furthermore, a combined levelling and pressure regulating valve 105 may be employed in the liquid pressure braking system described with reference to FIGS. 7 and 8 in place of the pressure reducing valve 137. Moreover the pressure reducing valve 137 may be employed in the liquid pressure braking system described above with reference to FIGS. 1 to 6 in place of the combined levelling and pressure regulating valve.

Although both embodiments of the invention described above in detail are provided with a pressure regulating valve 105 or 137 in only one of its two conduit systems through which liquid under pressure is supplied to motor cylinders applying brakes to wheels of the vehicle, it will be appreciated that both the conduit systems may be provided with such a pressure control valve if desired. Where there is only one pressure control valve provided in the divided fluid pressure braking system in accordance with this invention the pressure regulating valve usually will be so positioned as to at least control the pressure acting to apply the rear brakes of the vehicle. Any suitable alternative to the combined pump and cutoff valve 23, the isolating valve 51, the driver's control valve 73 and the combined levelling and pressure regulating valve, or the pressure reducing valve 137 may be utilized in the fluid pressure braking system without departing from the scope of this invention.

The amount by which one of the pistons 57 of the isolating valve 51 moves inwardly following the occurrence of a leak in the accumulator 54 or 55, or in the associated conduit system, to which liquid under pressure is fed past the other piston 57, depends upon the rating of the spring 58. If the spring 58 is loaded sufficiently lightly, the piston 57 will move inwardly by a distance which is sufficient for it to cover the inlet port 50 and the orifice 62 so as to prevent the supply of liquid from the pump to the bore 56. Alternatively if the spring rating is such that spring loading exceeds the loading on the piston 47 due to the pressure differential by an amount which is sufficient to prevent the piston 57 from moving inwardly to cover the port 50, it will be appreciated that liquid will continue to be supplied to the bore 56 and thus to the leaking accumulator or associated conduit system.

I claim:

1. A fluid pressure braking system for a vehicle and the like, comprising a fluid reservoir and a fluid pump, said pump being in communication with said reservoir to receive fluid therefrom, at least two motor cylinders, at least two conduit systems, each conduit system in communication with a motor cylinder and said pump to receive fluid therefrom, an accumulator with a nonreturn valve in each system disposed downstream of said pump to receive fluid therefrom through its nonreturn valve, said nonreturn valves being positioned in a common valve body, a driver operable control valve means disposed in each said system downstream of said accumulators operatively connected thereto to control the supply of fluid under pressure from each accumulator to its motor cylinder, a reservoir return line in communication with said pump for returning fluid thereto, and a single cutoff valve in communication with said return line and disposed upstream of said nonreturn valves to return fluid to said reservoir when the fluid pressure of said accumulators is at a predetermined level, said common valve body having a through bore connected at each of its ends to the fluid pressure accumulator of the corresponding conduit system and intermediate its ends to the fluid pump through said cutoff valve, two pistons being disposed in the through bore urged by spring means mounted between them against stops which locate them one on each side of the connection to the fluid pump, and passages for the flow of fluid past the pistons from the fluid supply means to the fluid pressure accumulators, each of said nonreturn inlet valves being positioned within the corresponding one of said passages, the arrangement being such that upon the occurrence of reduction in the pressure of fluid delivered to the space between the two pistons, which pressure reduction does not exceed a predetermined maximum pressure reduction, the two pistons more towards each other to reduce the volume of the space therebetween and to restore the predetermined fluid pressure therein.

2. A fluid pressure braking system of claim 1, wherein a fluid pressure control valve is provided to control the pressure of fluid supplied to the motor cylinder of one of the conduit systems by operation of said driver operable control valve means, said fluid pressure control valve being operated in response to changes in the vertical position of the vehicle body relative to the vehicle wheels to control the fluid pressure acting in the motor cylinder of said one conduit system in relation to the loading of the vehicle.

3. A fluid pressure braking system of claim 2, wherein the fluid pressure control valve is controlled by liquid pressure in a strut system which transmits weight to the vehicle wheels.

4. A fluid pressure braking system of claim 3, wherein the fluid pressure control valve comprises a valve casing adapted for mounting on the body of the vehicle, one valve device in said valve casing including a control valve member slidable in a control valve bore and adapted to control flow of fluid between the driver operable control valve means and the corresponding motor cylinders or cylinder, said control valve member being arranged to be urged in a valve opening direction by the liquid pressure acting in said strut system and in a closing direction by the fluid pressure acting in said motor cylinder or cylinders..

5. A fluid pressure braking system of claim 4, including a leveling valve comprising a leveling valve body adapted for mounting on the body of the vehicle, a leveling valve spool slidable in a leveling valve bore and adapted to be connected to an axle or wheel mounting of the vehicle so as to be moved in the leveling valve bore by relative vertical displacement of the vehicle body and the axle or wheel mounting, said leveling valve spool being arranged to control connections between the liquid filled strut system, which is arranged between the vehicle body and the axle or wheel mounting, said fluid supply means and a drain, and to trap liquid in said strut system at a pressure so related to the weight supported by said strut system that the vehicle structure is supported at a predetermined level.

6. A fluid pressure braking system as claimed in claim 5, wherein the fluid pressure control valve and the leveling valve are mounted in the same valve casing.

7. A fluid pressure braking system as claimed in claim 2, wherein the fluid pressure control valve is a pressure reducing valve in which the degree of pressure reduction is controlled by variations in the load supported by the vehicle wheels.

8. A fluid pressure braking system of claim 7, wherein the pressure reducing valve comprises a reducing valve plunger slidable in a reducing valve bore and having therein a cavity in constant communication with the fluid supply means, one end of the reducing valve bore being connected to the corresponding motor cylinder or cylinders, a passage in said reducing valve plunger connecting the cavity to said one end of the reducing valve bore, a closure valve member in said cavity to close said reducing valve plunger passage, rod means extending through said reducing valve plunger passage and arranged to hold said closure valve member off its seat when said reducing valve plunger is in a predetermined position, the loading of said resilient loading means increasing with the load supported by the vehicle wheels, the arrangement being such that the fluid pressure at said one end of the reducing valve bore acts to displace the reducing valve plunger against the resilient loading means and therefore to close the closure valve when the pressure at said one end of the reducing valve bore provides a thrust on the reducing valve plunger sufficient to move it against the resilient loading means.

9. A fluid pressure braking system as claimed in claim 2, wherein the fluid pressure control valve is provided to control the pressure of fluid supplied to a motor cylinder in which the fluid pressure acts to apply a brake to a rear wheel of the vehicle.

10. A fluid pressure braking system of claim 1, including fluid pressure responsive control means for a warning device, the fluid pressure responsive control means including an actuating plunger slidable in a cylinder connected to said through bore in substantially the same cross-sectional plane thereof as the connection to the fluid pump.

11. A fluid pressure braking system of claim 10, wherein said fluid pressure responsive control means includes an electric switch which is spring biased to its closed position and which is arranged to be held open by the action on said actuating plunger of fluid under pressure supplied to said through bore, the arrangement being such that the fluid pressure acting upon said actuating plunger to hold said electric switch open is reduced upon the occurrence of a substantial drop of pressure in one of said conduit systems so that the electric switch is closed to operate the warning device.

12. A fluid pressure braking system of claim 11, wherein the driver operable control valve means comprises a control valve for controlling simultaneously the supply of fluid under pressure from the fluid pressure accumulator of each conduit system to the corresponding motor cylinder or cylinders.

13. A fluid pressure braking system of claim 11, wherein the control valve comprises two valve plungers mounted in parallel side by side valve bores and axially movable to connect motor ports in said valve bores selectively to a corresponding one of the two fluid pressure accumulators or to a drain, the motor ports being connected to the corresponding motor cylinders, a substantially rigid plate movable to apply thrust to both of said valve plungers, and a pad of elastomeric material through which thrust is applied to the substantially rigid plate to move the valve plungers towards the positions in which they connect the motor ports to the fluid pressure accumulators, the arrangement being such that pressure existing in the motor ports acts on the valve plungers to urge them against said pad.

* * * * *